(12) United States Patent
Mulligan et al.

(10) Patent No.: US 7,517,580 B2
(45) Date of Patent: Apr. 14, 2009

(54) ALIGNED COMPOSITE STRUCTURES FOR MITIGATION OF IMPACT DAMAGE AND RESISTANCE TO WEAR IN DYNAMIC ENVIRONMENTS

(75) Inventors: Anthony C. Mulligan, Tucson, AZ (US); Mark J. Rigali, Tucson, AZ (US); Manish P. Sutaria, Malden, MA (US); Dragan Popovich, Redmond, WA (US); Joseph P. Halloran, Tucson, AZ (US); Michael L. Fulcher, Tucson, AZ (US); Randy C. Cook, Tucson, AZ (US)

(73) Assignee: Advanced Ceramics Research, Inc., Tucson, AZ (US)

( * ) Notice: Subject to any disclaimer, the term of this patent is extended or adjusted under 35 U.S.C. 154(b) by 677 days.

(21) Appl. No.: 11/298,194

(22) Filed: Dec. 9, 2005

(65) Prior Publication Data

US 2006/0091580 A1 May 4, 2006

Related U.S. Application Data

(60) Division of application No. 10/310,594, filed on Dec. 4, 2002, now Pat. No. 6,974,624, which is a continuation-in-part of application No. 10/005,084, filed on Dec. 4, 2001, now Pat. No. 6,709,737.

(60) Provisional application No. 60/251,172, filed on Dec. 4, 2000.

(51) Int. Cl.
*B28B 5/00* (2006.01)
*B28B 1/00* (2006.01)
*B32B 9/04* (2006.01)
*D21H 11/00* (2006.01)
*D21H 13/00* (2006.01)

(52) U.S. Cl. ............... 428/241; 264/250; 264/639; 428/411.1; 428/311.51; 428/311.71; 428/315.9

(58) Field of Classification Search ............... 264/241, 264/250, 639; 428/411.1, 315.9, 311.51, 428/311.71, 210, 304.4
See application file for complete search history.

(56) References Cited

U.S. PATENT DOCUMENTS

| 4,772,524 A | 9/1988 | Coblenz |
| 4,788,096 A | 11/1988 | Kalnin |
| 5,053,092 A | 10/1991 | Lachman |
| 5,116,663 A | 5/1992 | Fujimoto |

(Continued)

FOREIGN PATENT DOCUMENTS

WO WO 01/53059 7/2001

OTHER PUBLICATIONS

J.J. Brennan and K.M. Prewo, "High-Strength Silicon Carbide Fibre Reinforced Glass-Matrix Composites", *J. Mater. Sci.*, 15 463-68 (1980).

(Continued)

*Primary Examiner*—Lynda Salvatore
(74) *Attorney, Agent, or Firm*—Banner & Witcoff, Ltd.

(57) ABSTRACT

Fibrous monolith composites having architectures that provide increased flaw insensitivity, improved hardness, wear resistance and damage tolerance and methods of manufacture thereof are provided for use in dynamic environments to mitigate impact damage and increase wear resistance.

6 Claims, 6 Drawing Sheets

U.S. PATENT DOCUMENTS

| | | | |
|---|---|---|---|
| 5,120,688 | A | 6/1992 | Hsieh |
| 5,175,709 | A | 12/1992 | Slayton |
| 5,201,022 | A | 4/1993 | Shifflett |
| 5,294,387 | A | 3/1994 | Nakano |
| 5,398,193 | A | 3/1995 | Deangelis |
| 5,588,997 | A | 12/1996 | Lysson |
| 5,645,781 | A | 7/1997 | Popovic' |
| 5,679,157 | A | 10/1997 | Milliman |
| 5,869,189 | A | 2/1999 | Hagood, IV |
| 6,046,499 | A | 4/2000 | Yano |
| 6,063,502 | A | 5/2000 | Sue |
| 6,171,532 | B1 | 1/2001 | Sterzel |
| 6,193,001 | B1 | 2/2001 | Eyre |
| 6,203,752 | B1 | 3/2001 | Bewlay |
| 6,235,165 | B1 | 5/2001 | Wakasono |
| 6,315,065 | B1 | 11/2001 | Yong |
| 6,325,165 | B1 | 12/2001 | Eyre |
| 6,361,873 | B1 | 3/2002 | Yong |
| 6,447,896 | B1 | 9/2002 | Augustine |
| 6,451,442 | B1 | 9/2002 | Sue |
| 6,709,737 | B2 | 3/2004 | Rigali |
| 6,805,946 | B2 | 10/2004 | Mulligan |
| 2002/0127384 | A1 | 9/2002 | Mulligan |
| 2002/0154741 | A1 | 10/2002 | Rigali |

OTHER PUBLICATIONS

J.J. Brennan and K.M. Prewo, "Silicon Carbide Fibre Reinforced Glass-Ceramic Matrix Composites Exhibiting High Strength and Toughness", *J. Mater. Sci.*, 17 2371-83 (1982).

G. Hilmas et al., "Bibrous Monoliths: Non-Brittle Fracture from Powder Processed Ceramics", *Mat. Sci. & Eng. A.*, 195, 263-268 (1995).

G. E. Hilmas et al., "SiC and $Si_2N_{44}$ Fibrous Monoliths: Non-Brittle Fracture From Powder Processed Ceramics Produced by Coextrusion", vol. 51 *Ceramic Processing Science and Technology*, pp. 609-614 (1993).

H. Kodama et al., "Silicon Carbide Monofilament-Reinforced Silicon Nitride or Silicon Carbide Matrix Composites", *J. Am. Ceram. Soc.*, 72 [4] 551-58 (1989).

D. Kovar et al., "Fibrous Monolithic Ceramics", *J. Am. Ceram. Soc.*, 80, [10] 2471-2487 (1997).

P. J. Lamicq et al., "SiC/SiC Composite Ceramics", *Am. Ceram. Soc. Bull.*, 65 [2] 336-38 (1986).

T.I. Mah et al., "Recent Developments in Fiber-Reinforced High Temperature Ceramic Composites", *Am. Ceram. Soc. Bull*, 66 [2] 304-08 (1987).

K.M. Prewo, "Fiber-Reinforced Ceramics: New Opportunities For Composite Materials", *Am. Ceram. Soc. Bull.*, 68 [2] 395-400 (1989).

J.R. Strife et al., "Status of Continuous Fiber-Reinforced Ceramic Matrix Composite Processing Technology", *Ceram. Eng. Sci. Proc.*, 11 [7-8] 871-919 (1990).

Mark A. Janney, Stephen D. Nunn, Claudia A. Walls, Ogbemi O. Omatete, Randy B. Ogle, Glen H. Kirby, And April D. Mcmillan, "Gelcasting," *The Handbook of Ceramic Engineering* . 1998.

PCT International Search Report mailed Feb. 25, 2003, (PCT/US02/38804).

PCT International Search Report mailed Feb. 28, 2003, (PCT/US02/38654).

PCT International Search Report mailed Mar. 6, 2003, (PCT/US02/38680).

PCT International Search Report mailed May 23, 2005 for (PCT/US02/38648).

ALIGNED COMPOSITE STRUCTURES FOR MITIGATION OF IMPACT DAMAGE AND RESISTANCE TO WEAR IN DYNAMIC ENVIRONMENTS

CROSS-REFERENCE TO RELATED APPLICATIONS

This application is a divisional of U.S. patent application Ser. No. 10/310,594 filed Dec. 4, 2002, which is a continuation-in-part of U.S. patent application Ser. No. 10/005,084, filed Dec. 4, 2001. This application also is based on, and claims the benefit of, U.S. Provisional Application No. 60/251,172, filed on Dec. 4, 2000, and entitled "Aligned Fibrous Monolith Constructs for Mitigation of Foreign Object Damage in Dynamic Environments." The specifications of these applications are incorporated herein by reference.

This invention was made with U.S. Government support under grants DE-FC02-96CH10861 and DE-FC26-01NT41051 awarded by the Department of Energy. Accordingly, the Government may have certain rights in the invention described herein.

FIELD OF THE INVENTION

The present invention relates to fibrous monolith composites that provide increased flaw insensitivity, improved hardness, wear resistance, and damage tolerance for use in dynamic environments to mitigate impact damage to, and/or increase the wear resistance of, structures comprising such materials.

BACKGROUND OF THE INVENTION

Certain carbides, nitrides, borides, oxides, and suicides exhibit enhanced mechanical properties, including damage tolerance and wear resistance. As a result, these materials have found use in dynamic environments where the materials are subject to harsh conditions, such as increased wear, thermal shock, elevated temperatures and the like. For example, many of the carbides, nitrides, borides, oxides, and silicides of the elements from Groups IVb, Vb, and VIb of the periodic table, as well as carbides, nitrides, borides, oxides, and silicides of boron, aluminum, and silicon have been used in industrial and other applications where such conditions are likely to be encountered. Generally, structures formed of these materials exhibit improved strength and hardness at ambient and elevated temperatures, improved toughness and wear resistance, high melting points, thermal shock resistance, and oxidation resistance.

These materials have found use in the fabrication of structures that may be subject to impact damage by foreign objects, which is commonly referred to as foreign object damage (FOD), such as in turbomachinery and turbine engine applications. These materials also may be used for the fabrication of tools, inserts and other implements that may be subject to wear and/or impact damage, such as in mining, construction, machining of metals and composite materials and similar industrial applications. For example, because of their abrasive, impact and wear resistance properties, materials formed of carbides, nitrides, borides, oxides, and silicides have been used in mining applications where, for example, extremely severe wear conditions and impact loadings may be encountered by the drill bits during rock crushing and removal. Additionally, because of their ability to withstand high temperatures, these materials also have been used in machining applications where very high localized temperatures may be encountered adjacent the cutting edge of the tool.

The usefulness of such materials, however, has been limited by a lack of wear resistance, damage tolerance and fracture toughness exhibited by the materials. As a result, structures fabricated from these materials tend to wear and/or fracture more quickly than is desired. The need for frequent replacement of parts is costly and results in down time that is both time consuming and costly.

Metallic and ceramic cutting tools, for example, are subject to harsh conditions during use that can result in unpredicted failure of the tool. The challenges in predicting when the various cutting tools in a machine will fail and their useful life, among other problems, can become very costly in terms of equipment downtime and replacement costs. In order to overcome the challenges associated with metallic and ceramic cutting tools, a separate coating material may be applied to the outer surface of the cutting tool to provide additional wear, crater and heat resistance.

One process for coating cutting tools and other wear surfaces is chemical vapor deposition, or "CVD," where a coating is applied to a substrate in a hot-wall reactor. The coating material typically is produced by reactive deposition from a gaseous phase at elevated temperatures. For example, one coating material, TiC, is produced when $TiCl_4$ vapor is mixed with $CH_4$ at approximately 1000° C. and converted to fine-grained TiC crystals. Coating thicknesses produced by CVD range between about 5 to about 20 μm. Multiple layers of different coating materials often are required to coat a substrate in order to obtain the desired functional properties. A typical CVD cycle can last 24 hours or more from load to unload, making the process very time consuming. Additionally, CVD processes require ancillary equipment that is costly and involves potentially environmentally hazardous gases and chemicals.

Another process for coating cutting tools and other wear surfaces is physical vapor deposition, or "PVD," where a vaporized or ionized compound is deposited within a vacuum chamber. Common PVD methods include vacuum vapor deposition by arc melting, crucible melting, cathodic sputtering and reactive sputtering. Arc melting provides the fastest deposition rate, while cathodic and reactive sputtering are relatively slow processes in which about 1 μm of coating is deposited per hour. Crucible melting can only be used with pure metals and compounds that do not dissociate on evaporation. Coating thicknesses produced by PVD range between about 2 to about 10 μm. PVD processes provide the advantage of lower processing temperatures (about 400° C.) as compared to CVD processes. Similar to CVD, however, PVD processes require ancillary equipment that is costly and involves potentially environmentally hazardous gases and chemicals.

In addition to the equipment and maintenance requirements associated with CVD and PVD processes, other shortcomings are associated with these processes. As with any discrete coating material applied onto another, different material, concerns relating to the thickness of the coating (including the desire to prolong the life of the coating by increasing its thickness while not impairing the physical structure of the substrate), the compatibility of the coating with the substrate, the ability of the coating to provide the desired material properties, and the strength of the bond between the coating and the substrate also exist.

There remains a need for materials exhibiting improved hardness, strength, wear resistance and fracture toughness, as compared to presently known materials, for use in dynamic environments to mitigate impact damage to, and/or increase the wear resistance of, structures comprising such materials. There also remains a need for materials exhibiting improved wear resistance and coating durability as compared to materials coated using conventional processes, including CVD and PVD.

SUMMARY OF THE INVENTION

The present invention relates to structures that include unique architectural arrangements of fibrous monolith ("FM") composites to provide the structures with enhanced mechanical properties, including increased flaw insensitivity, increased wear resistance, and damage tolerance. The present invention also relates to methods of fabricating such composites and structures.

Fibrous monoliths are a unique class of structural materials that have mechanical properties similar to continuous fiber reinforced ceramic composites ("CFCCs"). Such properties include relatively high fracture energies, damage tolerance, and graceful failures, as well as chemical inertness and thermal shock resistance. In contrast to CFCCs, however, FMs can be produced at a significantly lower cost. FMs, which include ceramics and/or other metals, generally may be manufactured by powder processing techniques using inexpensive ceramic or metal powders or combinations thereof. As a result of the high performance characteristics of FMs and the low costs of manufacture, FMs can be used in a wider range of applications than heretofore typical for monolithic ceramic composites.

The composite materials of the present invention may be used as coatings for existing structures to mitigate impact damage in dynamic environments and to reduce wear on the structures, as the composites demonstrate very high fracture energies, increased flaw insensitivity, increased wear resistance, and increased damage tolerance. The composite materials also may provide a renewable coating material having superior wear and lubricating characteristics for surfaces of ball bearings, wear parts, such as cutting tool inserts and, round tools, including drills, endmills and routers, and the like where it is desired to include a lubricating material to further reduce wear. In other aspects, a more substantial portion of, or even a complete, structure may be formed from the FM composites, thereby extending the benefits obtained with use of the FM composites.

Generally, FM composites include one or more filaments having at least a core material and a shell material, which generally are selected from diamond, graphite, ceramic oxides, ceramic carbides, ceramic nitrides, ceramic borides, ceramic silicides, ceramic phosphates, metals, metal alloys, intermetallics and combinations thereof. A plurality of filaments may be bundled together one or more times to provide a final filament that includes a plurality of core and shell phases of reduced diameters. An FM composite may include a plurality of core phases maintained in spaced separation by one or more shell phases. Such arrangements inter alia result in controlled failure of the structure to avoid unpredicted, catastrophic failures. The core phases of the FM composites, which typically provide structural strength and hardness, may include ceramic, carbide and metallic materials. The shell phase(s) typically enhances the toughness of the composite structure by creating pressure zones, microcrack zones, ductile-phase zones, and/or weak debond-type interfaces. These weak interfaces between the discrete core phases are intended to deflect cracks and to delaminate, thereby limiting brittle failure of the FM composite.

In other embodiments as referenced above, at least one of a core or shell material of the FM composite includes a lubricious composition to further reduce wear associated with high cutting and contact forces. The lubricious composition may be selected to enhance wear resistance as well as the cosmetic attributes of the composite structure. A plurality of filaments having a lubricious shell composition may be bundled together to provide a predetermined amount of the lubricating composition at the wear surface. In other aspects, a monolithic structure having a wear surface includes a lubricious composition contained within the monolithic structure to provide a predetermined amount of the lubricious composition at the wear surface at any time during the life of the structure. The structures are fabricated so that a predetermined amount of the lubricious composition is available at the wear surface even as the surface is worn down by use. The lubricious composition essentially serves as a renewable lubricating coating for the wear surface during the life of the structure.

In other embodiments, the relative volume fractions of the compositions comprising the core and shell phases of a filament, as well as the arrangements of the core and shell phases may be varied to meet the functional and structural properties desired for the FM composite. The volume fraction of the core composition thus may be less than that of the shell composition. In other aspects, the harder material that typically forms the core phase of a filament may be provided instead as a shell phase that surrounds one or more discrete phases of a weaker and/or more ductile composition (where the weaker and/or more ductile composition thus forms the core phase of the filament).

Methods of fabricating FM composites include extruding core and shell compositions in a "green" state to form a filament of elongated polycrystalline cells that become fiber-like after sintering or hot pressing. The process allows use of thermodynamically compatible materials that are available as sinterable powders in forming core/shell bi-component fibers. The scale of the microstructure results from the green fiber diameter (core size) and coating thickness (shell thickness). Once the green composite filament is fabricated, it may be formed into essentially any desired shape. The final component may have, for example, conventional composite architecture (e.g., uniaxial lay-up, biaxial lay-up, woven fabric, etc.) or other predetermined architecture. Two or more layers may be combined in fabricating the FM composite. Adjacent layers may include filaments arranged in different architectures (e.g., a layer having a uniaxial architecture in combination with a layer having a biaxial architecture). Layers of monolithic materials also may be included in a multiple-layer FM composite. The thermoplastic binder may be removed in a binder burnout step, and the component may be hot pressed or sintered to obtain a fully consolidated and densified component.

Methods of forming coating composites for wear surfaces, including multifaceted and angled wear surfaces include providing an FM coating layer with one or more FM filament layers and having a shape corresponding to the shape of the wear surface so that the FM coating layer may be disposed over the surface with limited cutting or piecing required. The coating layer may be formed so that the axes of the filaments comprising at least the outer layer of the coating are positioned to be normal to the wear surface.

BRIEF DESCRIPTION OF THE DRAWINGS

FIG. 8b is a cross-sectional view of an insert coated with the coating of FIG. 8a.

DETAILED DESCRIPTION OF THE INVENTION

In accordance with the present invention, structures are provided having composite materials exhibiting mechanical properties including high hardness, excellent fracture toughness, damage tolerance and/or wear and abrasion resistance and methods of preparation thereof. More particularly, the present invention relates to fibrous monolithic ceramic, carbide and/or metallic composites. The composites may include a plurality of filaments having a core material surrounded by a shell material. The composites may be formed into structures or may be formed into coatings or layers disposed at the surface of structures to impart the desired characteristics to the structures.

As used herein, "fibrous monolithic composite" and "fibrous monolith" are intended to mean a ceramic, carbide and/or metallic composite material. The composite material may include a plurality of monolithic fibers, or filaments, each having at least a cell phase surrounded by a boundary phase. The composite material also may include more than one cell and/or boundary phase. Fibrous monoliths exhibit, among other material properties, the characteristic of non-brittle fracture, such that they provide for non-catastrophic failure.

As used herein, "cell phase" is intended to mean a material that is dense, relatively hard and/or strong. The cell phase typically is centrally located in the fiber. The cell phase typically extends axially through the length of a fiber, so that when a fiber is viewed in transverse cross-section, the cell phase forms the core of the fiber. The "cell phase" also may be referred to as a "cell," "core" or "core phase".

As used herein, "boundary phase" is intended to mean a more ductile and/or weaker material of the fiber. The boundary phase typically at least partially surrounds the cell phase in a relatively thin layer. The boundary phase typically is disposed between the various individual cell phases, forming a separating layer between each cell phase and surrounding cell phases when a plurality of fibers are formed into a fibrous monolithic composite. The "boundary phase" also may be referred to as a "shell," "shell phase," "cell boundary" or "boundary".

As used herein, "lubricious" is intended to mean the characteristic of providing lubricity, such as between two surfaces in contact with one another. Without wishing to be bound by any theories, lubricity may be provided by the composition itself, as well as by a film, such as an oxide or oxycarbide film, that may form when the lubricious composition is exposed to the ambient atmosphere.

Figure 1:
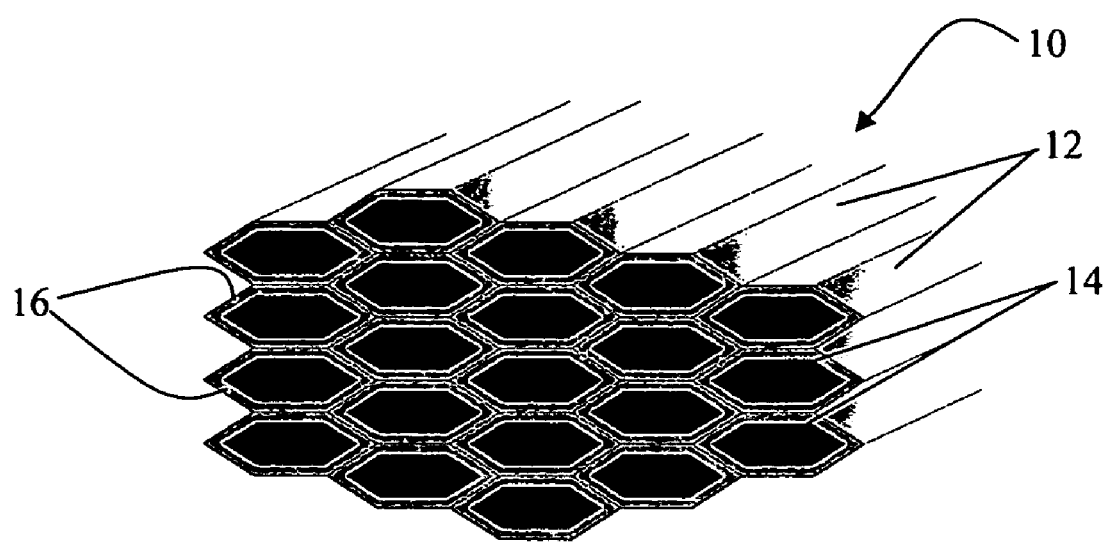
FIG. 1 is a perspective cross-sectional view of a uniaxial fibrous monolith composite in accordance with the present invention.

As shown in FIG. 1, the macroarchitecture of a fibrous monolith ("FM") composite 10 generally includes multiple filaments 12 each comprising at least two distinct materials—a first phase in the form of elongated polycrystalline cells 14 separated by a relatively thin second phase in the form of cell boundaries 16. Generally, the first phase materials are disposed within the second phase materials so that the second phase materials surround each of the first phase materials and maintain the individual first phase materials in spaced separation. Typical volume fractions of the two phases are between about 50 to about 99% of the fiber for the first phase (polycrystalline cell) and between about 1 to about 50% of the fiber for the second phase (cell boundary). Preferably, the volume fractions are between about 80 to about 95% for the first phase (polycrystalline cell) and between about 5 to about 20% for the second phase (cell boundary). In other embodiments, the volume fractions of the two phases are varied to provide the desired functional and structural properties, and the volume fraction of first phase may be less than that of the second phase. Thus, volume fractions of between about 1 to about 99% of the fiber for either phase are contemplated.

The cell phase generally includes structural materials for strength and durability. The boundary phase generally includes materials to provide weak interfaces in the FM composite either by their material properties (e.g., more ductile material), such as fluoromica and lanthanum phosphate, or structural properties (e.g., porous material), such as graphite-containing powder mixtures and boron nitride-containing powder mixtures. In other embodiments, a metallic debond phase may be desired, and reducible oxides of metals may be used. In still other embodiments, at least one of the cell phase and boundary phase includes a lubricious composition to enhance the wear resistance of the FM composite.

Compositions of the cell and boundary phase materials include powders and other additives, as desired. Starting materials for the compositions include diamond, graphite, ceramic oxides, ceramic carbides, ceramic nitrides, ceramic borides, ceramic silicides, ceramic phosphates, metals, metal alloys, intermetallics and combinations thereof. More particularly, suitable starting materials include diamond, graphite, aluminum oxides, barium oxides, beryllium oxides, calcium oxides, cobalt oxides, chromium oxides, dysprosium oxides and other rare earth oxides, hafnium oxides, lanthanum oxides, magnesium oxides, manganese oxides, niobium oxides, nickel oxides, tin oxides, aluminum phosphate, yttrium phosphate, lead oxides, lead titanate, lead zirconate, silicon oxides and silicates, thorium oxides, titanium oxides and titanates, uranium oxides, yttrium oxides, yttrium aluminate, zirconium oxides and their alloys; boron carbides, iron carbides, hafnium carbides, molybdenum carbides, silicon carbides, tantalum carbides, titanium carbides, uranium carbides, tungsten carbides, zirconium carbides; aluminum nitrides, cubic boron nitrides, hexagonal boron nitrides, hafnium nitride, silicon nitrides, titanium nitrides, uranium nitrides, yttrium nitrides, zirconium nitrides; aluminum boride, hafnium boride, molybdenum boride, titanium boride, zirconium boride; molybdenum disilicide; lithium and other alkali metals and their alloys; magnesium and other alkali earth metals and their alloys; titanium, iron, nickel, chromium, cobalt, molybdenum, tungsten, hafnium, rhenium, rhodium, niobium, silver, tantalum, iridium, platinum, zirconium, palladium and other transition metals and their alloys; cerium, ytterbium and other rare earth metals and their alloys; aluminum; carbon; lead; tin; and silicon, and combinations thereof.

The compositions of the cell phase differ from those of the boundary phase. The cell phase and boundary phase are selected to have generally different compositions in order to provide the benefits generally associated with FMs. For example, the compositions may include formulations of different compounds (e.g., HfC for the cell phase and WRe for the boundary phase or WC—Co and W—Ni—Fe, for the respective phases) or formulations of the same compounds but in different amounts (e.g., WC-3% Co for the cell phase and WC-6% Co for the boundary phase), as long as the overall material properties of the two phases are not the same. The compositions can be selected so that no excessively strong bonding occurs between the two phases.

Figure 2:
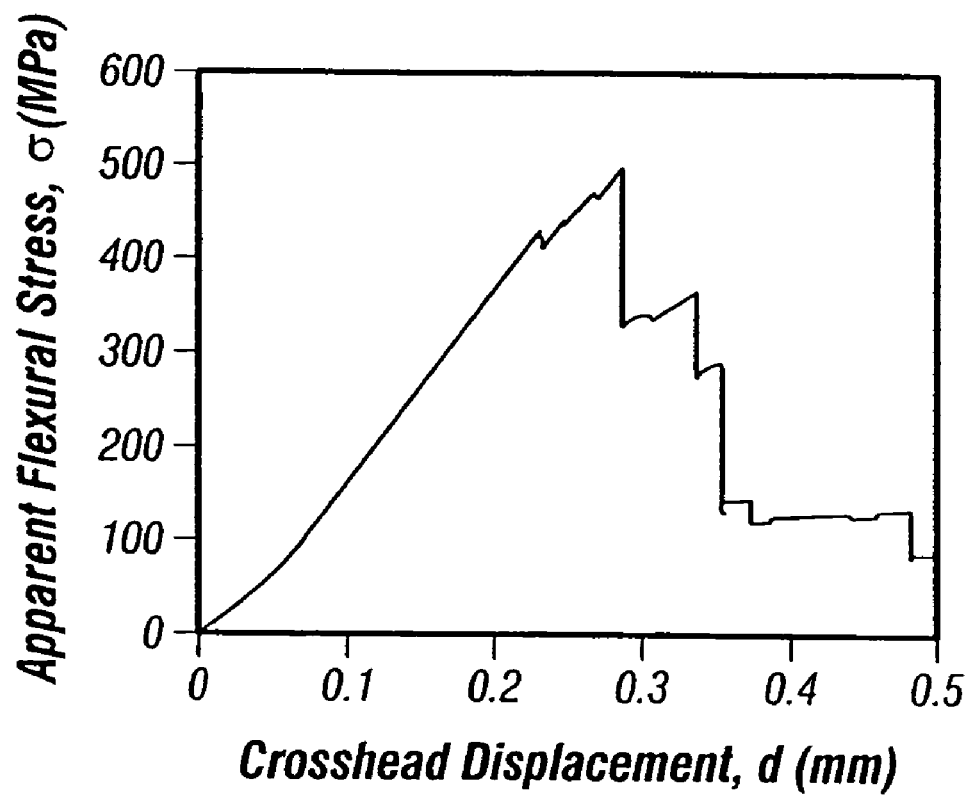
FIG. 2 is a graphical illustration of flexural stress as a function of displacement for a fibrous monolith composite in accordance with the present invention.

The cell phase may be selected to provide structural strength and hardness. The boundary phase may be selected to create pressure zones, microcrack zones, ductile-phase zones, or weak debond-type interfaces in order to increase the toughness of the composite. For example, low-shear-strength materials provide weak debond-type cell boundaries. Examples of such materials include graphite and hexagonal boron nitride, as in $Si_3N_4$/BN and SiC/graphite FM composites. The weak interfaces between the discrete cell phases deflect cracks and delaminate to limit and even avoid brittle failure of the composite and increase fracture toughness. As a result, FM structures exhibit the characteristics of controlled non-catastrophic failure. By way of example, typical flexural stress as a function of displacement for a $Si_3Ni_4$/BN fibrous monolith material is shown in FIG. 2, which illustrates how fibrous monolith composites may be non-brittle and retain significant load bearing capability after fracturing is initiated.

In other embodiments, at least one of the cell and boundary phases is selected to provide a lubricating substance. The FM composite thus includes a lubricious composition that forms at least a partial coating at the outer surface of the composite. The lubricious coating enhances the wear resistance of the FM composite, particularly when the FM composite is used in wear parts, ball bearings or similar implements. Structures, such as cutting tools, that have high wear rates are subject to detrimental and degradative conditions that limit the effectiveness and efficiency of the structure over time, particularly as the material being cut flows across the surface of the structure. Over time, increase in cutting forces, edge build-up of cut material, reduction of surface finish quality, and reduction in machine tolerance may be encountered and may lead to decreases in productivity. Desired characteristics of the lubricious composition include resistance to abrasion, high melting point, self-lubricating, chemical inertness, and compatibility with the other compositions of the FM composite. The composition also may be selected to enhance the cosmetic attributes of the structure, as well. The lubricious composition may have an appearance that contrasts with that of the FM composite generally for ease of identification of worn edges or other degradation of the structure.

Composites of the present invention include multifilament FM layers and FM substrates with unique fiber orientations. These composites may be used to fabricate various structures, or may be applied as coatings on the desired structures, to mitigate impact damage to the structures. The FM composites of the invention demonstrate, among other beneficial properties, very high fracture energies, increased flaw insensitivity, increased wear resistance, and increased damage tolerance. Such properties can be critical in applications where impact damage from foreign objects is a concern, for example, in turbomachinery and turbine engine applications. Use of the composites also may increase the wear resistance lifetime of structures used in dynamic environments, such as the environments encountered in the mining and metal cutting tool industries. When used for their lubricious properties to form cutting tools and the like, the composites of the invention avoid the problems associated with use of a discrete coating at the surface of the cutting tool, such as thickness limitations and separation of the coating from the tool, by providing a tool with integral lubricious material that remains available at the cutting surface over the life of the tool.

The FM composites exhibit enhanced thermal shock resistance, wear resistance, and erosion and oxidation/corrosion resistance, high hardness, high elastic modulus, good strength at ambient and elevated temperatures, and high toughness at room and elevated temperatures. These properties make these materials suited for use in wear applications in mining and similar applications. A wear component formed of the FM composites will maintain its geometry for extended periods during operation due to the high hardness of the FM composite. The wear component also is more resistant to the abrasive conditions associated with crushed rock environments. The wear component is better able to withstand the loads experienced during operation because of good flexural and tensile strength at ambient and elevated temperatures. High fracture toughness of the FM composite lessens the likelihood that the wear component will fracture under dynamic loads and impacts experienced when contacting crushed rock during material removal. Resistance to corrosion extends the useable life of the wear component despite the extreme load and environmental conditions associated with mining processes.

These material properties also make the FM composites of the invention suitable for cutting tool applications. A tool formed of the FM composites will maintain a sharp cutting edge for extended periods during operation due to the high hardness of the FM composite. The tool also is better able to withstand the loads experienced during cutting because of good flexural and tensile strength at room and elevated temperatures. High fracture toughness of the FM composite lessens the likelihood that the tool will fracture under dynamic loads and impacts experienced during cutting. Good thermal shock resistance lessens the likelihood of the tool shattering during thermal cycling that occurs during cutting. Tools are less susceptible to elastic deformation under cutting loads because of high elastic modulus. Resistance to corrosion and oxidation allows the tool to better maintain a sharp edge under extreme load, temperature, and environmental conditions encountered during cutting.

Low shear strength shell phase compositions accommodate the material expansions and contractions that occur during thermal cycling of the FM composite components and provide improved thermal shock resistance. Such shell phase compositions enable non-catastrophic failure through stress delocalization and crack deflection mechanisms both at room and elevated temperatures. A ductile or relatively ductile boundary phase increases the overall damage tolerance and wear resistance properties of the FM composite. Without intending to be limited by any theories, it is believed that the improvement in damage tolerance of the composites of the invention is attributed to the FM architecture in which the boundary phase material absorbs and deflects crack energy during impact so that damage, should it occur, is isolated to the individual micron-sized cells.

Figure 3:
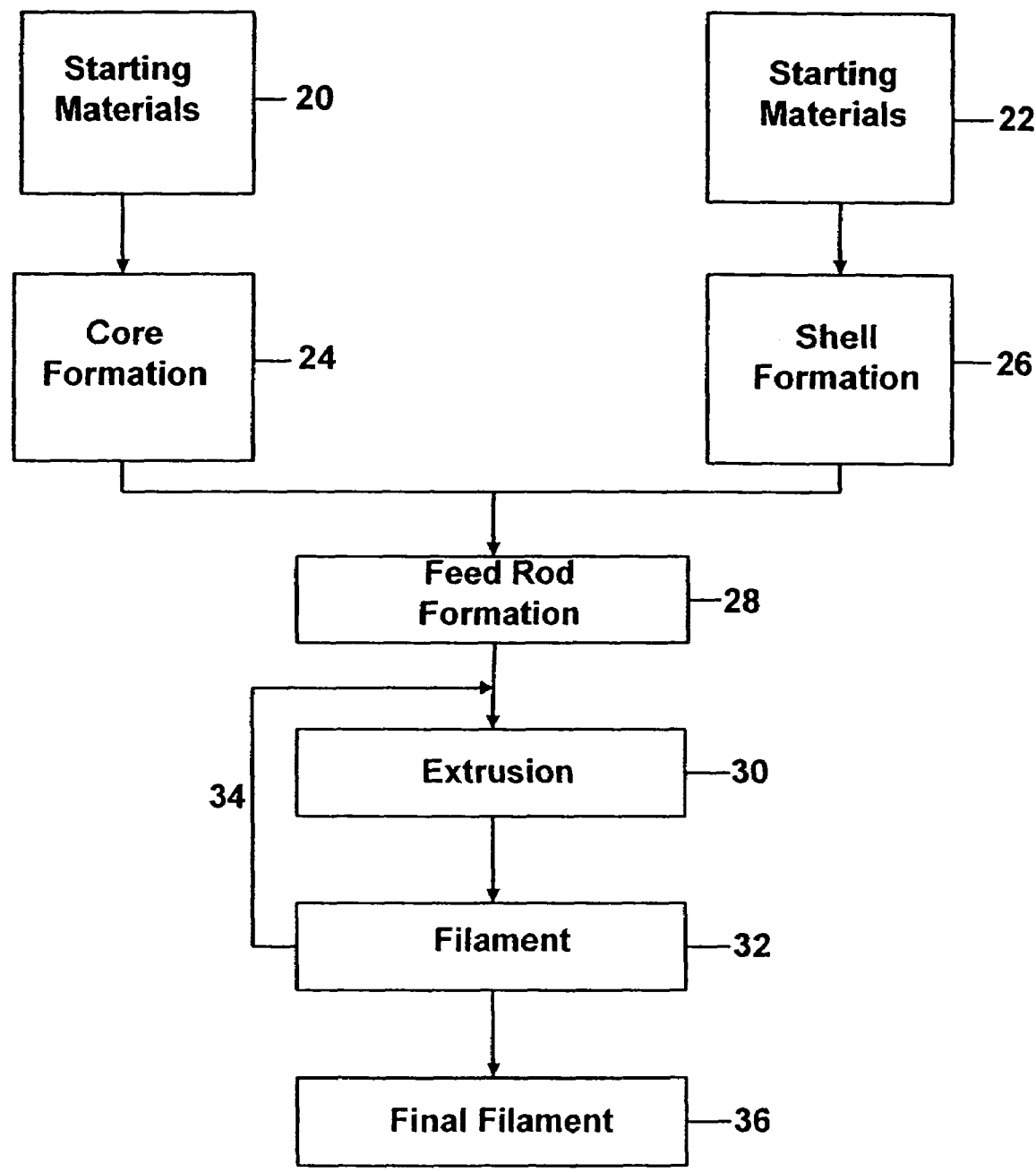
FIG. 3 is a schematic flow diagram showing a process of preparing filaments in accordance with the present invention.

Various methods of preparing fibrous monolithic filaments are known in the art, including the methods disclosed in U.S. Pat. No. 5,645,781, which is incorporated by reference herein. Generally, as illustrated in FIG. 3, in a non-continuous process of preparing fibrous monolithic filaments, starting materials for a core composition 20 and shell composition 22 are separately blended, and the core 24 and shell 26 are formed. Commercially available ceramic and metal powders can be used to prepare core and shell compositions for use in the invention. The compositions include powder, a thermoplastic polymer binder and other processing aids. The core and shell are combined into a feed rod 28, which is extruded 30 one or more times to provide a ceramic filament 32 of a predetermined length. Multiple filaments can be bundled and again extruded one or more times 34 to produce a finished filament 36 having desired core diameters. The individual or bundled filaments can be shaped into a structure of a desired configuration. In other embodiments, the individual or bundled filaments can be laid up into a predetermined arrangement to provide a multi-layer FM composite.

The core and shell compositions include mechanically activated and agglomerate-free powders. The core and shell compositions include one or more powders. Powders, such as the metals, alloys, carbides, nitrides, borides, oxides and silicides described herein, are selected to impart the desired structural and mechanical properties to the final FM composite. Powders having particle size distributions in the range of about 0.01 to about 100 microns (μm) in size may be used, although powders having other particle size diameters also may be used. In one embodiment, the particle size of the powder is between about 1 to about 10 microns.

Milling stations such as commercially available from Boston Gear, Boston, Mass. may be used as needed to ball mill the powder to obtain the desired size distribution. The powder can be ball milled with a solvent such as ethanol. The powder/solvent blend is ball milled with milling media such as silicon nitride ($Si_3N_4$) or zirconium oxide ($ZrO_2$) to provide a ball-mill slurry. Sintering aids such as, for example, aluminum oxide ($Al_2O_3$) and yttrium oxide ($Y_2O_3$) additions to $Si_3N_4$ can be milled together with the ball mill slurry as desired. The powders are milled for a time effective for providing desired particle sizes and distribution. Typical milling times are between about 24 to about 120 hours, depending on the starting material. For example, boron nitride (BN) powder is milled for about 12 to 24 hours, silicon nitride ($Si_3N_4$) powder is milled for about 24 hours, and zirconium carbide (ZrC), which is typically available as a fairly coarse refractory ceramic, is milled for a longer period, about 72 to 120 hours.

Upon completion of the milling operation, the ball mill slurry is collected from the milling station and the powder/solvent mixture is separated from the milling media. The solvent is separated from the powder, such as with a Buchi Rotavapor separator commercially available from Brinkman Instruments Inc. of Westbury, N.Y., where solvent is evaporated from the ball-milled slurry. The powder is dried.

The powders of the core and shell compositions are blended separately with thermoplastic melt-spinnable polymer binders, as well as one or more processing aids such as plasticizers, as desired, to form a smooth, uniformly suspended composite blend also referred to as a "dope". A high shear mixer commercially available from C.W. Brabender of South Hackensack, N.J. or from Thermo Haake of Paramus, N.J., can be used. Examples of thermoplastic binders include ethylene ethylacetate (EEA), commercially available as DPDA-618NT from Union Carbide, ethylene vinylacetate (EVA), commercially available as ELVAX 470 from E.I. DuPont Co., and Acryloid Copolymer Resin (B-67), commercially available from Rohm and Haas, Philadelphia, Pa. Examples of plasticizers include heavy mineral oil (HMO), commercially available as Mineral Oil White, Heavy, Labguard®, and methoxy polyethyleneglycol having a molecular weight of about 550 (MPEG-550) commercially available from Union Carbide. The composite blends are compounded at about 150° C. and a viscosity-modifying additive blended with the composite blend until a viscosity is obtained to provide rheology suitable for a molten fiber extrusion process.

The composite blends are warm-pressed into a "green" composite feed rod 28. A composite feed rod includes a core of a first material surrounded by a shell of a second material. A hydraulic vertical press with one or more heated cylindrical dies can be used to press the cores 24. A heated uniaxial platen press, such as commercially available from Carver Inc., of Wabash, Ind., can be used to press the shells 26 for the composite feed rods. The volume ratio of the core and shell of a composite feed rod can be varied to any desired ratio, such as by using different sets of machine tooled core and shell dies.

A pressed feed rod 28 is extruded 30. One extrusion process includes a computer numerically controlled (CNC) ball-screw extruder, including a ball screw from Thomson Saginaw of Saginaw, Mich., connected to a CNC directed current (DC) servomotor from Compumotor, Rohnert Park, Calif. The ball screw is connected to a brass metal rod that is used to pressurize and extrude the contents of the heated cylindrical die. The assembly is mounted and held vertically in a metal framework. Composite feed rods are extruded through a spinneret to produce a green fiber filament 32. This process also is referred to as "single filament co-extrusion" (SFCX).

The extruded filaments maintain the volume ratio of the original feed rod despite a decrease in diameter resulting from extrusion, such as a starting feed rod diameter of 22 mm and an extruded filament diameter of 250 μm (or an approximate 100 times reduction in starting feed rod diameter). Use of powder/thermoplastic blends having appropriate rheological properties for the cores and shells maintain the volume ratio of the original feed rod. Preferably, the viscosity of the core material is approximately equivalent to the viscosity of the shell material. Use of core and shell materials with approximately equivalent viscosities provides improved flow stability and control which helps to maintain the original geometry of the feed rod.

Example filament sizes are 100 µm, 250 µm, 320 µm, 500 µm, 750 µm, 1 mm, 2 mm or 4 mm in diameter. Filaments having diameters between about 0.01 and about 10 mm may be extruded using a spinneret fabricated with the appropriate orifice diameter. Filaments having diameters as small as about 250 µm or smaller can be produced by single filament co-extrusion. Care should be taken with smaller diameter green filaments as they may be broken during the winding and extrusion process, which can impede production of filaments having smaller diameters. To obtain filaments having cell sizes smaller than 250 µm, filaments having diameters of between about 1 to about 2 mm may be extruded and then bundled together to form a multifilament feed rod having a diameter of about 22 mm that is extruded. Using such a multifilament co-extrusion (MFCX) procedure, filaments having cell diameters of about 10 microns or less can be produced.

Filaments having more than one core composition and/or more than one shell composition can also be prepared to provide the benefits of the properties of the additional composition and/or to insulate the shell material. In one embodiment, a layer of a second core composition may be disposed around the shell, such that the filament includes a central core material, an intermediate shell material and an outer core material. In another embodiment, a core material in combination with a plurality of different shells may be used. Other combinations of core and shell materials also may be prepared as desired.

A plurality of filaments may be bundled together and extruded one or more times.

Figure 4A:
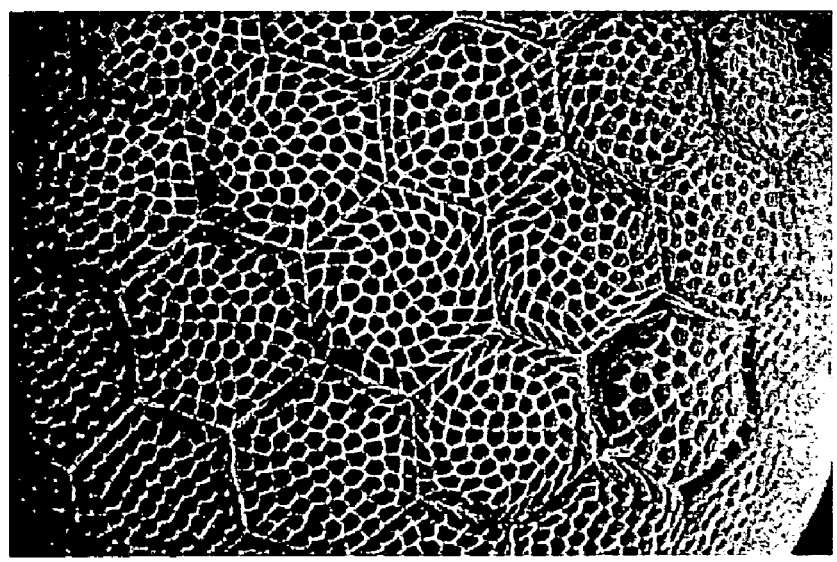
FIG. 4a is a photomicrograph of an axial cross-section of an FM composite in accordance with the present invention.
Figure 4B:
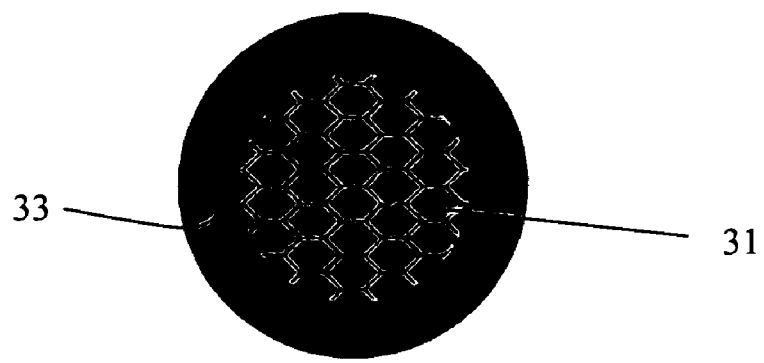
FIG. 4b is a perspective cross-sectional view of a fibrous monolith composite in accordance with the present invention showing a plurality of bundled filaments within an outer shell.

This arrangement of filaments results in essentially a "honeycomb" configuration, as shown in FIG. 4a. The plurality of bundled filaments 31 also can be disposed within an outer shell 33, as shown in FIG. 4b. A bundled arrangement maintains the mechanical behavior of the filaments but insulates a "weaker" inner shell material from the external environment and any harsh conditions.

Figure 4C:
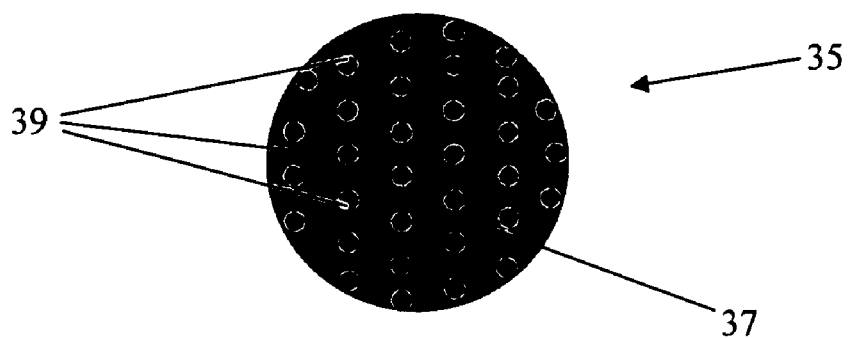
FIG. 4c is a perspective cross-sectional view of a fibrous monolith composite in accordance with the present invention showing a core material with a plurality of shell material filaments.

In other embodiments, the relative orientations of the core (typically the harder composition) and shell (typically the weaker and/or more ductile composition) are varied and the discrete cores may no longer be maintained in spaced separation by the shell. That is, the core composition may merge at one or more points and may even surround the shell composition, such that the core and shell are essentially reversed. In this aspect, a filament 35, as illustrated in transverse cross-section in FIG. 4c, includes a shell 37 of a harder composition with a plurality of cores, or other deposits, 39 of a weaker and/or more ductile composition disposed within. A plurality of such filaments 35 may be bundled together and extruded one or more times. One or more weaker and/or more ductile materials also can be disposed around the filament 35. This filament arrangement is useful in inter alia applications where it is desired to control the volume percentage and distribution of a lubricious composition throughout the composite structure, where the lubricious composition forms a part of or all of the weaker and/or more ductile composition.

The extruded, composite green filament generally is flexible and can be formed into various structures in accordance with the invention. The filament can be formed into structures either manually or mechanically. Mechanical methods include rapid prototyping processes, such as disclosed in co-pending U.S. patent application Ser. No. 10/005,656, incorporated herein by reference. Indexable cutting tool inserts, round tools (drills, endmills, routers, etc.), ball bearings and other structures can be formed entirely from the FM composites. Such structures provide enhanced mechanical properties associated with FM composites for the useful life of the structure. In comparison, the benefits of the FM composite coatings will last as long as the coating remains on the structure, that is, until the coating is worn through.

Filaments may be bundled, woven, wound, braided, chopped, pressed, or laid up to produce essentially a near net shape pre-form. For example, a composite filament is disposed about a mandrel or wound on a computer numerically controlled (CNC) drum winder. The winder includes a rotating plastic drum driven by a servomotor from Compumotor, Rohnert Park, Calif. A single axis motion controller from Compumotor, Rohnert Park, Calif. is used to adjust the filament position as the filament is wound around the drum. Two-dimensional parts having a desired fiber alignment can be fabricated using the CNC drum winder. After winding, composite filament sheets are cut to the desired shape and dimensions. The cut sheets can then be laid up in any standard 2D architecture (i.e. uniaxial, 0°/90°, quasi-isotropic, etc.). After the 2D pre-form is laid-up, it is warm lamintated, such as with a uniaxial platen press.

In other embodiments, an FM composite coating layer is formed and disposed at an outer wear surface of a structure. A composite coating may have a uniaxial filament orientation (FIG. 5d) where all of the filaments are arranged in generally the same direction, a bi-axial orientation (FIG. 5e) where layers of filaments are arranged so that filaments of adjacent layers are perpendicular, or a random orientation (FIG. 5f) where chopped filaments of predetermined lengths are randomly provided and pressed into a layer. Composite coatings also may include one or more multifilament FM layers disposed over a substrate, such as a uniaxial FM substrate, a quasiisotropic FM substrate, or a monolithic substrate. Composite coatings can be applied over a surface of a structure, essentially as a protective outer layer, to impart the desired mechanical properties to the structure.

In other aspects, composite coatings having two or more portions of FM composites of differing architectures are fabricated in a multiple-step process. In one step, a first FM layer is produced from a plurality of FM filaments. A plurality of extruded FM filaments are arranged to form a unidirectional FM billet that is laminated. The billet is sectioned transversely across its width into thin slices, wherein the cells of the multiple filaments are exposed along the planar surfaces of the slices. Each slice sectioned from the billet is the equivalent of one FM layer.

In another step, one or more FM coating substrates having fiber orientations different from those of the thin FM layers are produced. For example, a monolithic, a uniaxial, or a quasiisotropic FM coating substrate is produced from a plurality of FM filaments that are arranged, layered, woven, or otherwise manipulated to form a substrate having the desired fiber orientation. For example, a uniaxial FM coating substrate may be formed by arranging side-by-side a plurality of extruded FM filaments having a predetermined length to form essentially a sheet with the filament axes arranged in parallel and extending the length of the sheet. One or more sheets are layered on top of one another until a desired thickness is obtained.

Figure 5A:
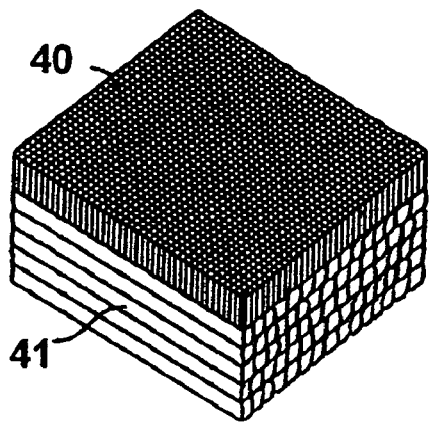
FIG. 5a is a schematic of a section of a fibrous monolith composite in accordance with the present invention, illustrating the filament orientations of a multifilament fibrous monolith layer and a uniaxial fibrous monolith substrate.
Figure 5B:
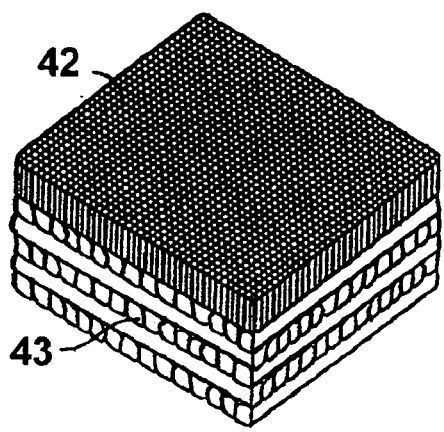
FIG. 5b is a schematic of a section of a fibrous monolith composite in accordance with the present invention, illustrating the filament orientations of a multifilament fibrous monolith layer and a quasiisotropic fibrous monolith.
Figure 5C:
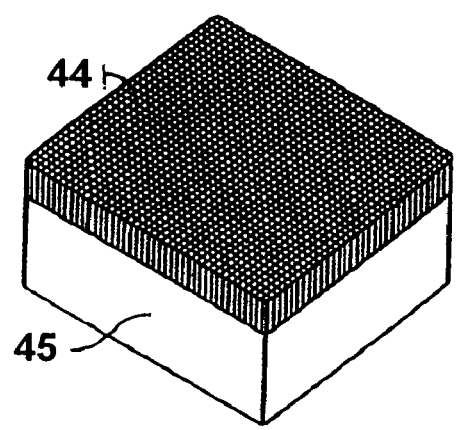
FIG. 5c is a schematic of a section of a fibrous monolith composite in accordance with the present invention, illustrating the filament orientations of a multifilament fibrous monolith layer and a monolithic substrate.
Figure 5D:
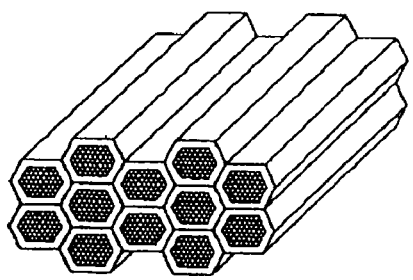
FIG. 5d is a schematic of a section of a fibrous monolith composite in accordance with the present invention, illustrating a uniaxial orientation.
Figure 5E:
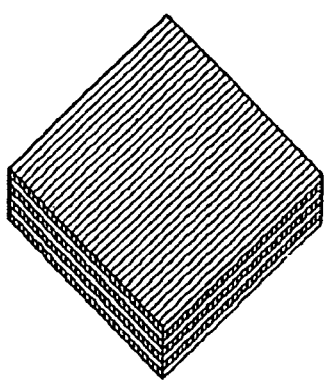
FIG. 5e is a schematic of a section of a fibrous monolith composite in accordance with the present invention, illustrating a bi-axial orientation.
Figure 5F:
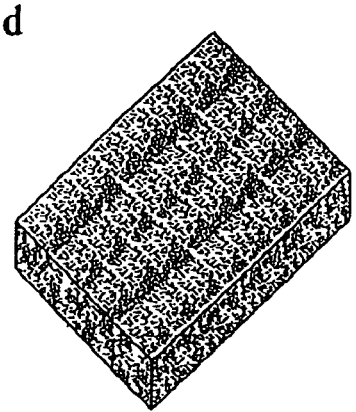
FIG. 5f is a schematic of a section of a fibrous monolith composite in accordance with the present invention, illustrating a random orientation.

An FM composite coating is fabricated by placing a thin FM layer over an FM coating substrate so that the orientation of the cells in the layer is normal to the surface of the substrate. FIG. 5a illustrates a composite having a multifilament FM layer 40 and a uniaxial FM substrate 41. FIG. 5b illustrates a composite having a multifilament FM layer 42 and a quasiisotropic FM substrate 43. FIG. 5c illustrates a composite having a multifilament FM layer 44 and a monolithic substrate 45.

Additional FM layers and FM coating substrates can be included as desired. The FM composite coating is disposed over a surface of structure to be coated, which can be an FM composite structure or any other type of structure. The coating and underlying structure are warm laminated to join the FM composite coating to the surface of the structure to form an FM composite-coated structure.

Figure 8A:
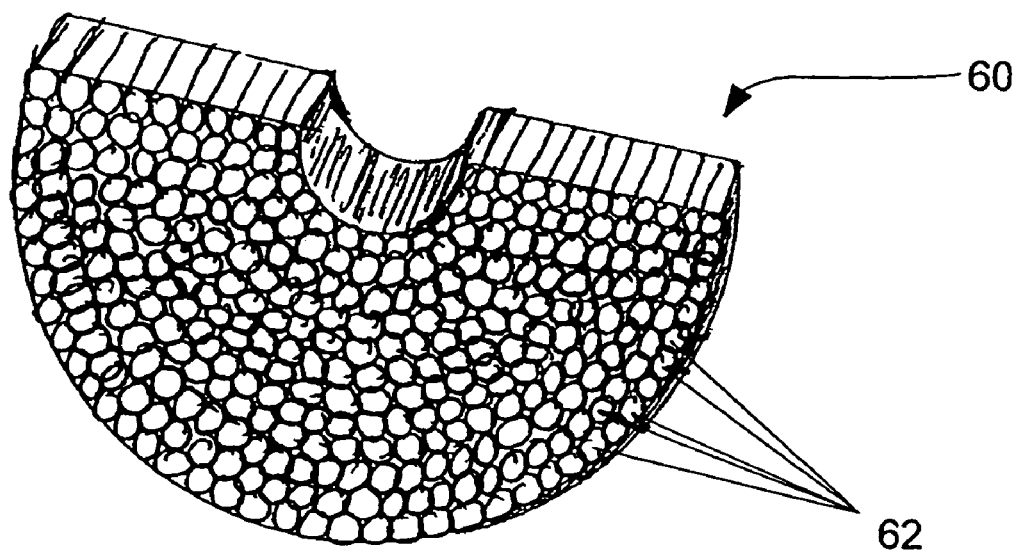
FIG. 8a is a perspective view of a fibrous monolith coating in accordance with the present invention.
Figure 8B:
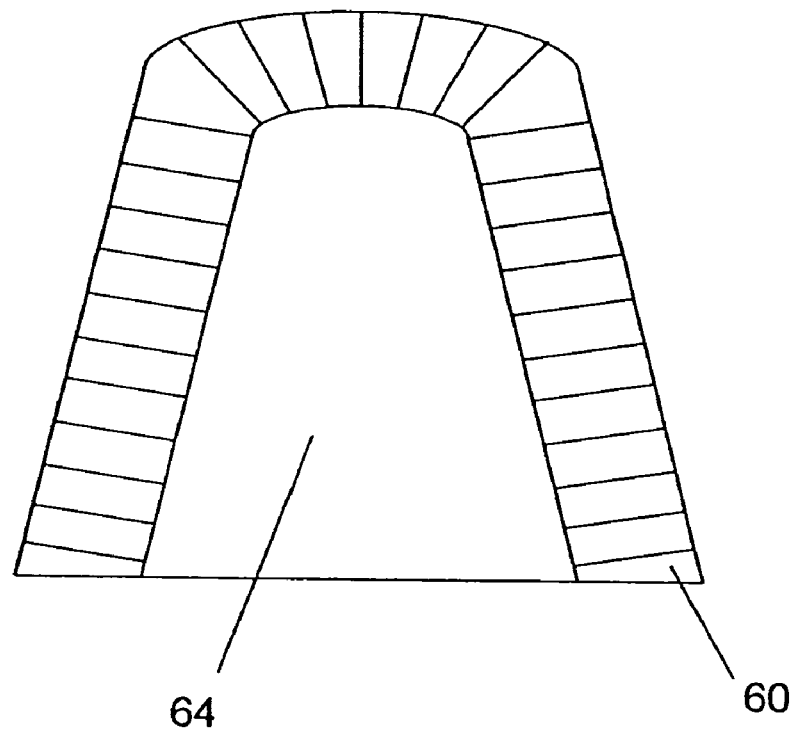

In other embodiments, coatings can be formed of a predetermined configuration that generally corresponds to the area of the surface to be coated. Such coatings are particularly suited for use with multifaceted and angled wear surface tooling. By way of example, an FM coating for a cone-shaped tooling insert is formed from a plurality of filaments. Generally, filaments are deposited in a cylindrical die having a solid center portion along the length of the die, where the filaments are arranged in the annular area around the center with their axes extending longitudinally through the cylinder. The filaments in the die are compressed in the green state to consolidate the filaments. The consolidated bundle of filaments is removed from the die and sectioned in two lengthwise portions, which are sectioned transversely into layers of a predetermined thickness. The cells of the multiple filaments are exposed along the planar surfaces of the layers. Referring to FIG. 8a, a coating layer 60 that includes a plurality of exposed cells 62 is illustrated. The coating layer thus formed can be wrapped around a conical tooling insert substrate with the cells in the layer being oriented normal to the surface of the substrate. The substrate 64 and coating 60 are consolidated to form an FM coating for the insert, as illustrated in FIG. 8b.

In another embodiment, the green filaments are grouped or bundled into a cylinder or other predetermined shape. The bundled filaments are cut to a predetermined length and machined, molded or otherwise formed to provide a structure having a desired shape and having the FM filaments extending generally parallel to the axis of the structure. One or more FM layers may be disposed across a surface of the structure as desired to provide increased enhancement of the mechanical properties of the structure. The FM composite structure is warm laminated to consolidate the FM filaments.

In other embodiments, articles having various filament characteristics and orientations may be provided. For example, in preparing an FM layer, different combinations of cell and/or boundary materials, filament size, filament shape, and filament orientation are contemplated as being within the scope of the invention. Such variations in these variables can be applied on a layer-to-layer basis, that is, a first layer is formed of filaments of uniform composition, size, shape and orientation and a second layer is formed with filaments having a composition, size, shape and/or orientation different from that of the first layer. Such variations also can be applied within a particular layer, that is, the layer is formed of filaments of differing compositions, sizes, shapes, and/or orientations. Any number and combination of layers may be used in forming the FM composite article in order to achieve the benefits of desired properties of the FM materials.

Although the invention is described with reference to generally cylindrical-shaped FM filaments that are bundled together to form FM composites wherein the shape of the filaments become essentially hexagonal in cross-section as a result of processing, other configurations are contemplated, as will be appreciated by those skilled in the art. For example, filaments having square, rectangular or triangular cross-sections may be obtained by varying the shape of the extrusion die accordingly. Additionally, the shape of the die used in the laminating step also may be modified accordingly as desired. Thus, different shapes and configurations of filaments in the FM composite may be obtained, which may impact the resultant mechanical properties of the FM composite.

Numerous modifications and adjustments to the process for preparing filaments may be made to allow for variations in the particular compositions used to prepare the filaments. For example, viscosities may be adjusted, the diameter of the extrusion die may be changed, or the relative volumes of the core and shell may be changed. Other methods for extruding and/or otherwise forming the filaments known to those of skill in the art also may be utilized. For example, the filaments may be produced using a continuous co-extrusion process, such as disclosed in U.S. patent application Ser. No. 10/005,683, incorporated herein by reference.

Final processing of the FM composite may be completed as desired to finish the composite. For example, a binder burnout furnace, such as commercially available from Lindberg, Watertown, Wis. is used to remove polymer binder from the formed composite coatings and FM composite structures. Sintering processes, including hot pressing, hot isostatic pressing or pressureless sintering, provide final consolidation and densification of the composite coatings and FM composite structures. A typical induction hot-press such as commercially available from Vacuum Industries, Somerville, Mass. is capable of a maximum temperature of 2400° C. and a maximum load of 100 tons and can be operated in several different environments including vacuum, argon, and nitrogen atmospheres. Pressureless sintering methods, such as disclosed in U.S. patent application Ser. No. 10/005,241, incorporated herein by reference, also can be used.

EXAMPLES

The following examples are intended to illustrate the present invention and should not be construed as in any way limiting or restricting the scope of the invention.

Example 1

The thermoplastic/powder blends are produced in batches and are formulated on a volumetric basis. One blend includes between about 50 to about 62 vol. % of ceramic powder, between about 37 to about 50 vol. % of thermoplastics, and between about 0 to about 12 vol. % of plasticizers. The mass of a batch of ceramic/thermoplastic dope varies with the density of the ceramic powder. A batch of $Si_3N_4$ has a density of about 3.44 g/cc and produces approximately 1 kg of "green" compound material.

Example 2

Initial damage resistant testing was conducted on a FM composite consisting of a cellular diamond material surrounded by a ductile metal phase of WC—Co (FIG. 4a). Impact drop tests demonstrated that the FM composite remained undamaged at much higher drop heights as compared to a standard monolithic diamond material.

Example 3

Composites having unique architectures were produced by fabricating $Si_3N_4$/BN FM layers and hot pressing the layers into different $Si_3N_4$-based substrates. Three different sets of $Si_3N_4$ were fabricated for testing. The three billets fabricated were: 1) a $Si_3N_4$/BN FM layer on a monolithic $Si_3N_4$ substrate, 2) a Si$_3$N$_4$/BN FM layer on a unidirectional Si$_3$N$_4$/BN FM substrate, and 3) a Si$_3$N$_4$/BN FM layer on a quasiisotropic Si$_3$N$_4$/BN FM substrate.

These samples were fabricated using a two-step process. First, the Si$_3$N$_4$/BN FM layer was produced. Specifically, a unidirectional Si$_3$N$_4$/BN billet (3"×4.5"×0.5") was laminated using multiple, extruded Si$_3$N$_4$/BN filaments. The individual cell size was approximately 200 µm. Thin 0.12 inch FM layers were produced by sectioning the billet into thin 0.12 inch slices along its width to expose the cells. Each 0.12 inch slice constituted a FM layer.

Second, the monolithic, uniaxial, and quasiisotropic FM substrates were processed. For the monolithic Si$_3$N$_4$ substrate, Si$_3$N$_4$ powder was compounded with thermoplastics and hot pressed into a 3"×3"×0.125" billet. For the uniaxial and quasiisotropic FM substrates, Si$_3$N$_4$/BN green fiber was extruded to produce 340 µm filaments. The filaments were then manually laid-up in the desired architectures to form billets. The laid-up billets were warm laminated. The final dimensions of the billets were 3"×3"×0.125".

Next, a FM composite was formed by placing the 0.12 inch FM slices on the three different substrates such that the orientation of the cells in the slices were normal to the surface of the substrates. The composites were then warm laminated to join the thin FM slices to the surface of each substrate. The overall thickness of the FM layer was approximately 25% of the overall thickness of the composite. The composites were placed in binder burnout for four days and then hot-pressed at 1750° C. and 3.1 ksi. Sections of the composites showing the architectures of the consolidated composites are generally as shown in FIGS. 5a-5c.

Example 4

A system including a multifilament tungsten carbide-cobalt alloy/tungsten-nickel-iron metal alloy FM composite exhibits high hardness, excellent fracture toughness, wear, and abrasion resistance and thus is suitable for use as a wear resistant, damage-tolerant material. Such a carbide-metal matrix composite may be used in metal and wood cutting tool inserts, as well as in applications in the mining and construction industries, including drill bit inserts, grader blade inserts, conical tool inserts and roof bit inserts.

Sinterable tungsten carbide-6%-cobalt powder (particle size of about −325 mesh) is blended with copolymers and plasticizer to form a FM core material according to the formulation shown in Table 1.

TABLE 1

| Material | Density (g/cc) | Volume % | Volume (cc) | Weight (g) |
| --- | --- | --- | --- | --- |
| WC—6% Co alloy[1] | 14.94 | 55.0 | 24.75 | 370.26 |
| EEA copolymer[2] | 0.93 | 24.0 | 10.80 | 10.04 |
| EAA copolymer[3] | 0.93 | 16.0 | 7.20 | 6.70 |
| MPEG-550[4] | 1.100 | 5.0 | 2.25 | 2.48 |

[1]tungsten carbide—6%—cobalt alloy from Cerac, Inc., designated as T-1175
[2]ethylene-ethyl acetate copolymers from Union Carbide
[3]ethylene-acrylic acid copolymers from Union Carbide
[4]methoxypolyethylene glycol, average molecular weight of 550 (a plasticizer)

A Brabender mixing machine is used to mix the materials. The MPEG 550 is added to adjust the blending torque of the mixture to approximately 200 kg-m$^2$. The mixture of materials can then be formed into a feed rod as described in detail above.

In a separate process, sinterable W—Ni—Fe alloy powder (particle size of about 2-5 µm) is blended with co-polymers and plasticizers to form the FM shell material according to the formulation shown in Table 2.

TABLE 2

| Material | Density (g/cc) | Volume % | Volume (cc) | Weight (g) |
| --- | --- | --- | --- | --- |
| W—Ni—Fe alloy[1] | 14.96 | 55.0 | 24.75 | 370.26 |
| EEA copolymer[2] | 0.93 | 24.0 | 10.80 | 10.04 |
| EAA copolymer[3] | 0.93 | 27.38 | 12.32 | 11.46 |
| B-67 copolymer[4] | 1.06 | 3.65 | 1.64 | 1.74 |
| Luwax AL 3[5] | 0.92 | 2.20 | 0.99 | 0.91 |
| MPEG-550[6] | 1.100 | 5.0 | 2.25 | 2.48 |
| HMO[7] | 0.881 | 6.40 | 2.88 | 2.54 |

[1]tungsten nickel iron alloy powder
[2]ethylene-ethyl acetate copolymers from Union Carbide
[3]ethylene-acrylic acid copolymers from Union Carbide
[4]acryloid resin from Rohm and Haas
[5]a wax from BASF
[6]methoxypolyethylene glycol, average molecular weight of 550 (a plasticizer)
[7]heavy mineral oil (a plasticizer)

A Brabender mixing machine is used to mix the materials. The MPEG 550 is added to adjust the blending torque of the mixture to approximately 100 kg-m$^2$. The mixture of materials can then be formed into a cylindrical shell as described in detail above.

A controlled geometry feed rod is assembled by combining the tungsten carbide cobalt core rod with the tungsten nickel iron shells. The feed rod is loaded into the extrusion cylinder and extruded at 150° C. A 2 mm diameter tungsten carbide-cobalt/tungsten-nickel-iron alloy monofilament fiber is obtained and collected on a motor controlled spooler. To fabricate the multifilament fiber, the tungsten carbide-cobalt/tungsten-nickel-iron alloy monofilament fiber is cut into 82 segments of 5.5 inches each and loaded into a molding cylinder to form a multifilament feed rod. This multifilament feed rod is extruded to form a continuous length of 2 mm multifilament fiber.

Figure 6:
FIG. 6 is a photomicrograph of an axial cross-section of another composite in accordance with the present invention.

The tungsten carbide-cobalt/tungsten-nickel-iron alloy multifilament fibers are arranged into a 1 inch wide by 3 inch long by 0.25 inch thick coupon and molded to provide a green fibrous monolith ceramic. The green tungsten carbide-cobalt/tungsten-nickel-iron alloy multifilament fibrous monolith ceramic is heated in a furnace in a nitrogen atmosphere to remove the binder and then hot pressed at 1550° C. and 2 ksi pressure for about 1 hour to provide a sintered fibrous monolith article having core to shell ratio of about 82.5% to about 17.5%. A photomicrograph of a polished, sintered article that was photographed through a reflected light microscope is shown in FIG. 6.

Example 5

A tungsten carbide material with a low cobalt content (for example, between about 0% to 6% cobalt by weight) that exhibits the mechanical properties of high hardness, wear resistance, and low toughness can be combined with a tungsten carbide material with a relatively high cobalt content (for example, between about 6% to 20% cobalt by weight) that exhibits the mechanical properties of moderate hardness, wear resistance and high toughness. The resulting FM composite exhibits improved mechanical properties as compared to the individual carbide constituents, including high hardness, excellent fracture toughness, and wear and abrasion resistance.

A multifilament tungsten carbide-3%-cobalt alloy/tungsten carbide-6%-cobalt alloy multifilament FM composite is prepared in this example. Sinterable tungsten carbide-3%-cobalt powder (particle size of about 5 μm) is blended with copolymer and plasticizer to form the FM core material according to the formulation shown in Table 3.

TABLE 3

| Material | Density (g/cc) | Volume % | Volume (cc) | Weight (g) |
|---|---|---|---|---|
| WC—3% Co alloy[1] | 15.26 | 50.0 | 22.50 | 336.38 |
| EEA copolymer[2] | 0.93 | 42.0 | 18.90 | 17.58 |
| MPEG-550[3] | 1.100 | 8.0 | 3.60 | 3.96 |

[1]tungsten carbide—3%—cobalt alloy from Stanford Materials, designated as CB7427-Q4
[2]ethylene-ethyl acetate copolymers from Union Carbide
[3]methoxypolyethylene glycol, average molecular weight of 550 (a plasticizer)

A Brabender mixing machine is used to mix the materials. The MPEG 550 is added to adjust the blending torque of the mixture to approximately 200 kg-m². The mixture of materials can then be formed into a feed rod as described in detail above.

In a separate process, sinterable tungsten carbide-6%-cobalt alloy powder (particle size of about −325 mesh) is blended with co-polymers and plasticizer to form the FM shell material according to the formulation shown in Table 4.

TABLE 4

| Material | Density (g/cc) | Volume % | Volume (cc) | Weight (g) |
|---|---|---|---|---|
| WC—6% Co alloy[1] | 14.94 | 50.0% | 22.50 | 336.38 |
| EEA copolymer[2] | 0.93 | 27.0% | 12.15 | 11.30 |
| EAA copolymer[3] | 0.93 | 18.0% | 8.10 | 7.53 |
| MPEG-550[4] | 1.100 | 5.0% | 2.25 | 2.48 |

[1]tungsten carbide—6%—cobalt alloy powder from Cerac, Inc., designated as T-1175
[2]ethylene-ethyl acetate copolymers from Union Carbide
[3]ethylene-acrylic acid copolymers from Union Carbide
[4]methoxypolyethylene glycol, average molecular weight of 550 (a plasticizer)

A Brabender mixing machine is used to mix the materials. The MPEG 550 is added to adjust the blending torque of the mixture to approximately 100 kg-m². The mixture of materials can then be formed into a cylindrical shell as described in detail above.

A controlled geometry feed rod is assembled by combining the tungsten carbide-3%-cobalt alloy core rod with the tungsten carbide-6%-cobalt alloy shells. The feed rod is loaded into the extrusion cylinder and extruded at 150° C. A 2 mm diameter tungsten carbide-3%-cobalt alloy/tungsten carbide-6%-cobalt alloy monofilament fiber is obtained and collected on a motor controlled spooler. To fabricate the multifilament fiber, the tungsten carbide-cobalt/tungsten-nickel-iron alloy monofilament fiber is cut into 82 segments of 5.5 inches each and loaded into a molding cylinder to form a multifilament feed rod. This multifilament feed rod is extruded to form a continuous length of 2 mm multifilament fiber.

The tungsten carbide-3%-cobalt alloy/tungsten carbide-6%-cobalt alloy multifilament fibers are arranged into a 1 inch wide by 3 inch long by 0.25 inch thick coupon and molded to provide a green fibrous monolith ceramic. The tungsten carbide-3%-cobalt alloy/tungsten carbide-6%-cobalt alloy multifilament fibrous monolith ceramic is heated in a furnace in a nitrogen atmosphere to remove the binder and hot pressed at 1400° C. and 2 ksi pressure to provide a sintered fibrous monolith article having core to shell ratio of about 82.5% to about 17.5%.

Example 6

Figure 7:
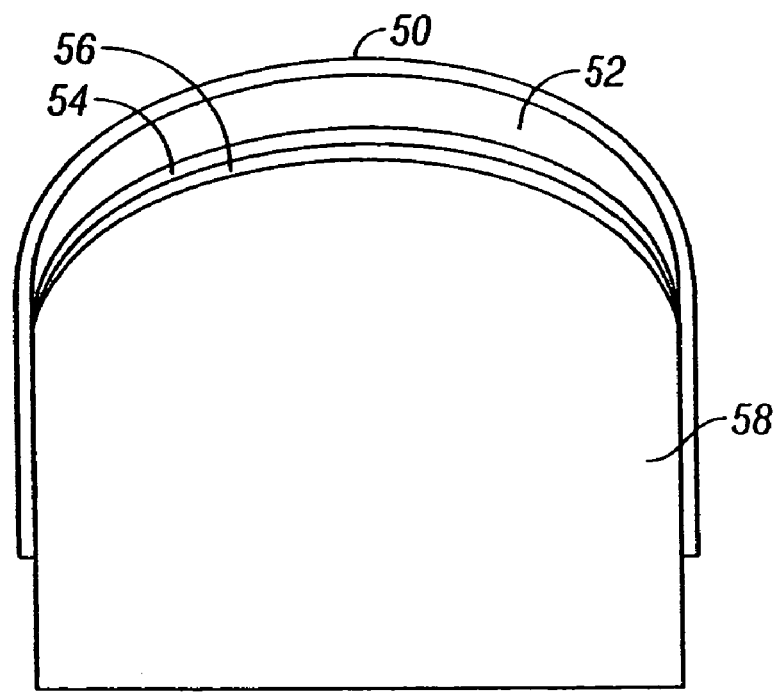
FIG. 7 is a perspective view of a fibrous monolith bit insert in accordance with the present invention.

A green feed rod about 3 inches long and about 0.79 inches in diameter was fabricated of a FM composition (diamond-WC—Co/WC—Co) in accordance with the present invention. The feed rods were formed of a plurality of FM filaments about 130 μm in diameter with the axis of each filament aligned parallel to the axis of the feed rod. The feed rod was sectioned radially into wafers of about 20 mm diameter and 0.03 inches thickness. The wafers were sanded down to a thickness of about 0.025 inches, dried at about 55° C., loaded into a niobium can, and laminated into hemispherically-shaped caps using a steel die and WC punch. As shown in FIG. 7, the niobium can 50 was loaded with the FM cap 52, two transition layers 54, 56 of diamond+WC+Co material, and a fully dense WC—Co insert 58. The green caps 52 were bonded to the niobium cans 50 by a thin layer of adhesive and fired. The inserts were cold pressed in a 40 ton press, loaded into a six-sided press and pressed at about 800,000 psi at about 1300° C. for about 4 to 5 minutes. After firing, the niobium can was removed in a boiling caustic solution followed by sand blasting and a minimum of machining to produce a finished bit insert.

Example 7

An FM composite including a lubricious composition was prepared. The core composition included $Al_2O_3$—TiC, and the shell composition included TiN. Formulations for the core and shell compositions are shown in Tables 5 and 6, respectively.

TABLE 5

| Material | Density (g/cc) | Volume % | Volume (cc) | Weight (g) |
|---|---|---|---|---|
| $Al_2O_3$—TiC[1] | 4.14 | 55.0 | 24.75 | 95.04 |
| EEA 1.5[2] | 0.93 | 25.0 | 11.25 | 10.46 |
| EEA 20[3] | 0.93 | 20.0 | 9.00 | 8.37 |

[1]available from Baikowski-Malakoff Inc. and HC Stark Inc.
[2]ethylene-ethyl acetate copolymers from Union Carbide
[3]ethylene-ethyl acetate copolymers from Union Carbide

TABLE 6

| Material | Density (g/cc) | Volume % | Volume (cc) | Weight (g) |
|---|---|---|---|---|
| TiN[1] | 5.22 | 55.0 | 24.75 | 129.20 |
| EEA 1.5[2] | 0.93 | 5.0 | 2.25 | 2.09 |
| EEA 20[3] | 0.93 | 40.0 | 18.00 | 16.74 |

[1]available from HC Stark Inc.
[2]ethylene-ethyl acetate copolymers from Union Carbide
[3]ethylene-ethyl acetate copolymers from Union Carbide Other compositions that may be used for the core composition include $Al_2O_3$—$ZrO_2$, $Si_3N_4$, WC—Co, WC—Ni, various powder metals (i.e., Aermet available from Carpenter Technology Inc.) and the like. Other compositions that may be used for the shell composition include TiAlN, TiC, $TiB_2$, $Al_2O_3$, AlN and the like.

Numerous modifications to the invention are possible to further improve the properties of structures used in dynamic environments. Thus, modifications and variations in the practice of the invention will be apparent to those skilled in the art upon consideration of the foregoing detailed description of the invention. Although preferred embodiments have been described above and illustrated in the accompanying drawings, there is no intent to limit the scope of the invention to these or other particular embodiments. Consequently, any such modifications and variations are intended to be included within the scope of the following claims.

What is claimed is:

1. A method of preparing a fibrous monolith composite comprising:

providing one or more green fibrous monolith filaments having a core composition and a shell composition that differs from the core composition;

arranging the one or more filaments in a predetermined orientation to form a first layer;

providing one or more additional green fibrous monolith filaments having a core composition and a shell composition that differs from the core composition;

arranging the one or more additional filaments in a second predetermined orientation to form a second layer, wherein the second layer is disposed adjacent the first layer; and shaping the layers to form the composite.

2. The method of claim 1 wherein the composite is disposed on a wear surface of a substrate and compression forces are applied to the composite and substrate.

3. The method of claim 2 further comprising adhering the composite to a wear surface with an adhesive compound.

4. The method of claim 1 wherein at least a portion of the filaments extend in a direction normal to the wear surface.

5. The method of claim 1 wherein a coating portion is formed from the green fibrous monolith filaments, the coating portion having a shape generally corresponding to the shape of the area of the wear surface to which it is to be applied to limit further shaping of the coating portion upon application to the wear surface.

6. The method of claim 5 wherein coating portion is formed by arranging one or more green fibrous monolith filaments in a die having an elongated, annular cavity to provide an annular feed rod upon application of compression forces, and sectioning the feed rod lengthwise along the longitudinal axis and sectioning the feed rod transversely into portions of a predetermined thickness to form a plurality of coating portions;

wherein each of the coating portions is applied about the outer surface of a substrate having a generally conical configuration to provide a wear part with integral coating upon application of heat and compression forces.

* * * * *